(12) United States Patent
Hirabayashi

(10) Patent No.: US 8,612,742 B2
(45) Date of Patent: Dec. 17, 2013

(54) METHOD OF AUTHENTICATION AT TIME OF UPDATE OF SOFTWARE EMBEDDED IN INFORMATION TERMINAL, SYSTEM FOR SAME AND PROGRAM FOR SAME

(75) Inventor: Yasushi Hirabayashi, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 0 days.

(21) Appl. No.: 13/395,604

(22) PCT Filed: Nov. 4, 2010

(86) PCT No.: PCT/JP2010/069605
§ 371 (c)(1),
(2), (4) Date: Mar. 12, 2012

(87) PCT Pub. No.: WO2011/055748
PCT Pub. Date: May 12, 2011

(65) Prior Publication Data
US 2012/0173867 A1  Jul. 5, 2012

(30) Foreign Application Priority Data
Nov. 6, 2009 (JP) ................................. 2009-254920

(51) Int. Cl.
*H04L 29/06* (2006.01)

(52) U.S. Cl.
USPC ........................................................ 713/150

(58) Field of Classification Search
USPC ........................................................ 713/150
See application file for complete search history.

(56) References Cited

U.S. PATENT DOCUMENTS

| 2003/0114144 A1 | 6/2003 | Minemura |
|---|---|---|
| 2003/0196102 A1 | 10/2003 | McCarroll |
| 2008/0229426 A1 | 9/2008 | Saitoh |

FOREIGN PATENT DOCUMENTS

| JP | 10-254840 A | 9/1998 |
|---|---|---|
| JP | 2002-157050 A | 5/2002 |
| JP | 2003-304235 A | 10/2003 |
| JP | 2004-070593 A | 3/2004 |
| JP | 2004-166090 A | 6/2004 |
| JP | 2005-148840 A | 6/2005 |
| JP | 2005-157497 A | 6/2005 |

(Continued)

OTHER PUBLICATIONS

Japanese Office Action dated Apr. 4, 2011 issued in a corresponding Japanese Patent Application No. 2009-254920.

(Continued)

*Primary Examiner* — Edan Orgad
*Assistant Examiner* — Harris Wang
(74) *Attorney, Agent, or Firm* — Sughrue Mion, PLLC

(57) ABSTRACT

A load on a server or a network is suppressed at a minimum, the authentication server is not necessary, and download of falsified software is prevented. A server creates a time-limited authentication key, computes a hash value of a file included in update software for each file to create a hash table in which hash values of a file are listed, and encrypts the hash table using the authentication key. A unit obtains the encrypted hash table and the authentication key from a server. An information terminal obtains the encrypted hash table from the unit, obtains the authentication key from the unit, determines whether or not a time limit of the authentication key is valid, obtains the encrypted hash table from the server if the time limit is determined to be valid as a result of the determination, decrypts the tables using the authentication key, compares the tables after decryption, and initiates download of the update software if both the tables are identical to each other.

10 Claims, 11 Drawing Sheets

(56) References Cited

FOREIGN PATENT DOCUMENTS

| | | |
|---|---|---|
| JP | 2006-190038 A | 7/2006 |
| JP | 2007-004598 A | 1/2007 |
| JP | 2008-003754 A | 1/2008 |
| JP | 2008-065611 A | 3/2008 |
| JP | 2008-226160 A | 9/2008 |
| JP | 2008-251021 A | 10/2008 |
| JP | 2009-124605 A | 6/2009 |
| JP | 2009-251977 A | 10/2009 |

OTHER PUBLICATIONS

Extended European Search Report dated Aug. 7, 2013 issued by the European Patent Office in counterpart European Application No. 10828308.6.

METHOD OF AUTHENTICATION AT TIME OF UPDATE OF SOFTWARE EMBEDDED IN INFORMATION TERMINAL, SYSTEM FOR SAME AND PROGRAM FOR SAME

CROSS REFERENCE TO RELATED APPLICATION

This application is a National Stage of International Application No. PCT/JP2010/069605, filed on Nov. 4, 2010, claiming priority based on Japanese Patent Application No. 2009-254920, filed Nov. 6, 2009, the contents of all of which are incorporated herein by reference in their entirety.

TECHNICAL FIELD

The present invention relates to a method of ensuring security when software embedded in an information terminal is updated.

BACKGROUND

Various techniques are employed to update software embedded in an information terminal. However, a technique of downloading or delivering update software from a server over a network is generally used. In this technique, since update software is uploaded on the server, and the information terminal downloads the update software from the server for updating, it is not necessary to directly perform software updating for a plurality of information terminals. This advantageously reduces a work load. In addition, security may be enhanced by that a server for authenticating is provided to authenticate whether or not the information terminal is appropriate for downloading, and download is permitted after authentication is made between the information terminal and the server. Particularly, for the information terminals where security is emphasized, such as a terminal capable of electronic payment, this technique is used to prevent confidential information such as a user's password from being leaked by falsification of software.

Examples of the authentication system such as typical software update are disclosed in Patent Literatures as follows.

In the technique disclosed in Patent Literature 1, in order to deliver a key for authenticating a terminal, a provisional authentication terminal is provided over a network, and the provisional authentication terminal performs authentication with the terminal. As a result, it is possible to reduce a network load to the server.

In the technique disclosed in Patent Literature 2, positional information of the terminal obtained from GPS is added to an encrypted text only known to the authentication server and the terminal, and authentication is performed between the authentication server and the terminal to permit download.

In the technique disclosed in Patent Literature 3, a user ID is transmitted from a personal computer to a server, and the server generates a key and a random number based on the ID. The generated key is converted into a 2-dimensional code and transmitted to the personal computer. The hash value of the transmitted 2-dimensional data is transmitted to the server again, and the server performs authentication.

In the technique disclosed in Patent Literature 4, a billing server that performs authentication for an Internet service billing system is separated from a contents server. The program is downloaded from the contents server to the personal computer when the contents server confirms the billing process.

In the technique disclosed in Patent Literature 5, download data from the server are accumulated in a relay apparatus over a network in advance to reduce a network load.

In the technique disclosed in Patent Literature 6, the configuration is equal to that of the technique disclosed in Patent Literature 5 except that the PC is substituted with a printer.

In the technique disclosed in Patent Literature 7, in order to alleviate a network load and a processing load of the download server, other client terminals can obtain the update software not from the download server but from the client terminal in which the download of the update software is completed.

CITATION LIST

Patent Literature

{PTL 1} JP-A-2005-157497
{PTL 2} JP-A-2004-70593
{PTL 3} JP-A-2008-003754
{PTL 4} JP-A-2006-190038
{PTL 5} JP-A-2009-124605
{PTL 6} JP-A-2005-148840
{PTL 7} JP-A-2008-65611

SUMMARY

Technical Problem

It is possible to ensure security by using the aforementioned techniques. However, each of the aforementioned techniques has the following problems.

In the technique disclosed in Patent Literature 1, it is difficult to reduce a network load when a number of provisional authentication terminals are provided.

In the technique disclosed in Patent Literature 2, the positional information of the terminal side is to be set again whenever the installation site of the terminal changes, and this is not suitable for a mobile application.

In the technique disclosed in Patent Literature 3, since authentication is performed in the server side, a network load is generated. Furthermore, when software is updated using the authentication method disclosed in Patent Literature 3, there is no remark regarding whether or not the downloaded file is falsified.

In the technique disclosed in Patent Literature 4, there is no consideration regarding whether or not the downloaded software is falsified.

In the technique disclosed in Patent Literature 5, download cannot be performed when the relay apparatus is down. In addition, in the technique disclosed in Patent Literature 5, since there is no determination regarding whether or not appropriate data is transmitted/received among three of the relay apparatus, the server, and the personal computer from the viewpoint of data falsification, security is not ensured. In addition, in the technique disclosed in Patent Literature 6, the personal computer which is one of the elements of the technique disclosed in Patent Literature 5 is substituted with a printer. Therefore, similar problems persist.

In the technique disclosed in Patent Literature 7, a client terminal has an authority to receive software from other client terminals. In this case, there is no consideration for a fact that forgery or falsification of the update software may occur.

The aforementioned problems can be summarized in three points as follows.

1. Software update cannot be performed when an error occurs in the authentication server.

2. A load on the server or the network increases in order to authenticate a plurality of information terminals.

3. If forgery occurs in a download destination server, falsified software may be downloaded, so that it is difficult to ensure security.

In this regard, the invention provides an authentication method used to update software embedded in the information terminal, a system thereof, and a program thereof, by which a load on the server or the network is suppressed at maximum, the authentication server is not necessary, and download of the falsified software can be prevented.

Solution to Problem

According to a first aspect of the present invention, there is provided a software update system of an information terminal including: an information terminal; a software download server connected to the information terminal via a network, the software download server storing update software; and a security unit communicable with the information terminal via a near field radio network, wherein the software download server creates a time-limited authentication key, computes a hash value of a file included in the update software for each file to create a hash table in which hash values of a file is listed, and encrypts the hash table using the authentication key, the security unit obtains the encrypted hash table and the authentication key from the software download server, and the information terminal obtains the encrypted hash table from the security unit as a first table, obtains the authentication key from the security unit, determines whether or not a time limit of the authentication key is valid, obtains the encrypted hash table from the software download server as a second table if the time limit is determined to be valid, decrypts the first and second tables using the authentication key, compares the first and second tables after decryption, and initiates download of the update software from the software download server if it is determined both the tables are identical to each other.

According to a second aspect of the present invention, there is provided an information terminal that updates software embedded therein, wherein the information terminal is configured to: obtain an encrypted hash table as a first table from a security unit communicable via a near field radio network, the encrypted hash table being created by a software download server by creating a time-limited authentication key, computing a hash value of a file included in the update software for each file to create a hash table in which hash values of a file are listed, and encrypting the hash table using the authentication key; obtain the authentication key from the security unit; determine whether or not a time limit thereof is valid; obtain the encrypted hash table as a second table from the software download server via a network if the time limit is determined to be valid as a result of the determination; decrypt the first and second tables using the authentication key; compare the first and second tables after decryption with each other; and initiate download of the update software from the software download server via a network if both the tables are identical to each other.

According to a third aspect of the present invention, there is provided a method of updating software of an information terminal in a system, the system including the information terminal, a software download server that is connected to the information terminal via a network and stores update software, and a security unit communicable with the information terminal via a near field radio network, the method comprising: the software download server creating a time-limited authentication key, computing a hash value of a file included in the update software for each file to create a hash table in which hash values of a file are listed, and encrypting the hash table using the authentication key; the security unit obtaining the encrypted hash table and the authentication key from the software download server; and the information terminal obtaining the encrypted hash table as a first table from the security unit, obtaining the authentication key from the security unit, determining whether or not a time limit of the authentication key is valid, obtaining the encrypted hash table as a second table from the software download server if the time limit is determined to be valid as a result of the determination, decrypting the first and second tables using the authentication key, comparing the first and second tables after decryption, and initiating download of the update software from the software download server if both the tables are identical to each other.

According to a fourth aspect of the present invention, there is provided a method of updating software embedded in an information terminal, comprising: obtaining an encrypted hash table as a first table from a security unit communicable via a near field radio network, the encrypted hash table being created by a software download server by creating a time-limited authentication key, computing a hash value of a file included in the update software for each file to create a hash table in which hash values of a file are listed, and encrypting the hash table using the authentication key; obtaining the authentication key from the security unit; determining whether or not a time limit thereof is valid; obtaining the encrypted hash table as a second table from the software download server via a network if the time limit is determined to be valid as a result of the determination; decrypting the first and second tables using the authentication key; comparing the first and second tables after decryption with each other; and initiating download of the update software from the software download server via a network if both the tables are identical to each other.

According to a fifth aspect of the present invention, there is provided a software update program embedded in an information terminal that updates software installed therein, the software update program causing a computer to function as the information terminal, wherein the information terminal is configured to: obtain an encrypted hash table as a first table from a security unit communicable via a near field radio network, the encrypted hash table being created by a software download server by creating a time-limited authentication key, computing a hash value of a file included in the update software for each file to create a hash table in which hash values of a file are listed, and encrypting the hash table using the authentication key; obtain the authentication key from the security unit; determine whether or not a time limit thereof is valid; obtain the encrypted hash table as a second table from the software download server via a network if the time limit is determined to be valid as a result of the determination; decrypt the first and second tables using the authentication key; compare the first and second tables after decryption with each other; and initiate download of the update software from the software download server via a network if both the tables are identical to each other.

Advantageous Effects of Invention

According to the invention, it is possible to suppress an increase of the load on the server or the network at minimum, require no authentication server, and prevent falsified software from being downloaded.

REFERENCE SIGNS LIST

100: SOFTWARE DOWNLOAD SERVER
101, 205: NETWORK COMMUNICATION UNIT
102, 202, 302: CPU
103, 204, 303: MEMORY UNIT
200, 210: INFORMATION TERMINAL
201, 301: BLUETOOTH COMMUNICATION UNIT
203: INPUT UNIT
206: DISPLAY UNIT
300: SECURITY UNIT
700: CONTACTLESS IC CARD
800: CRADLE
1000: NETWORK

DESCRIPTION OF EMBODIMENTS

First, an overview of embodiments of the invention will be described. According to embodiments of the invention, in general, a software updating method of the information terminal is performed using the following first to fifth means in order to ensure security.

First means: a role of the authentication server is performed by another information terminal or an equivalent apparatus.

Second means: a near field radio communication such as Bluetooth (registered trademark) is used as a communication unit for authentication.

Third means: the information terminal side determines whether or not the download server is appropriate.

Fourth means: identifies whether or not the application is falsified.

Fifth means: a time-limited encryption key having a particular expiration time limit is used.

Next, a configuration of the embodiment of the invention will be described in detail with reference to the accompanying drawings.

Figure 1:
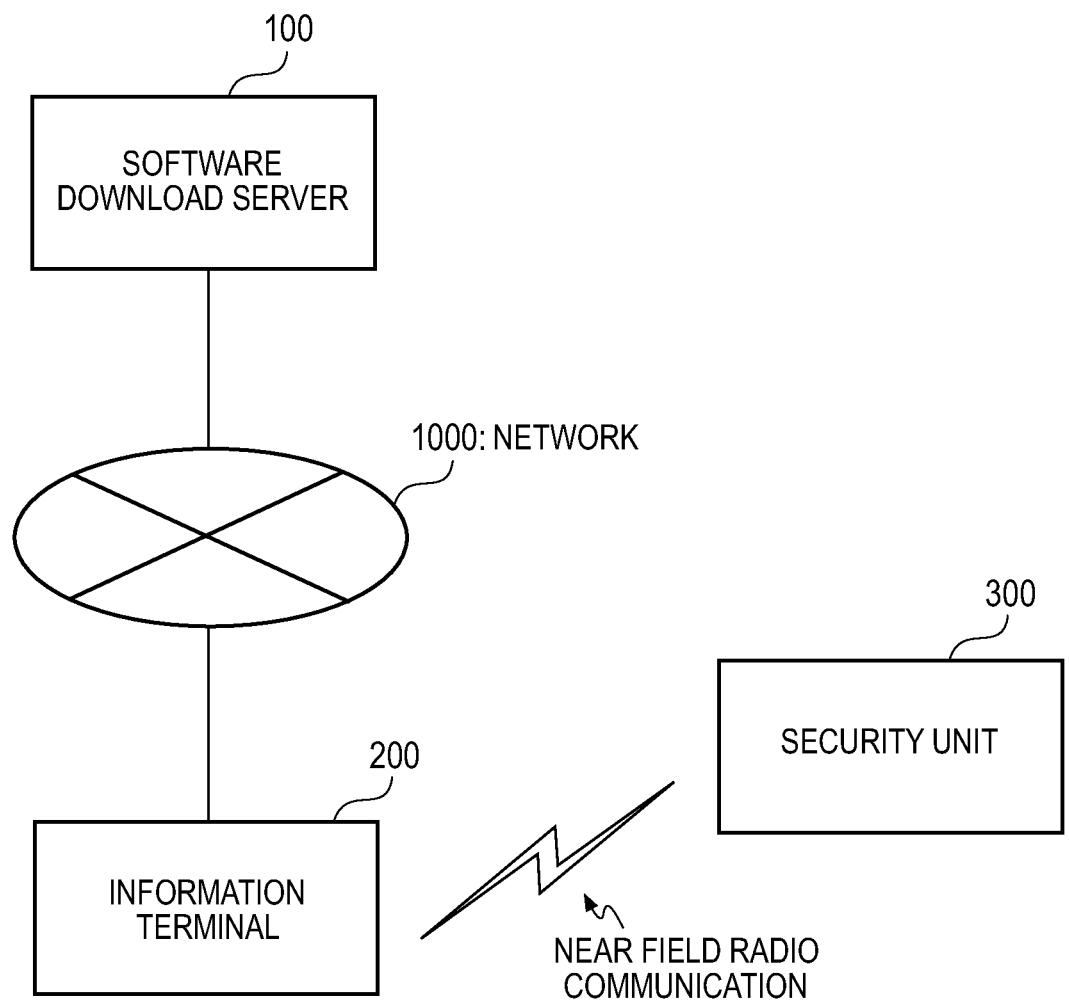
FIG. 1 A diagram illustrates a basic configuration of the entire system according to an embodiment of the invention.

FIG. 1 is a diagram illustrating an overview of the entire software update system according to an embodiment of the invention.

The software update system according to an embodiment of the invention includes a software download server 100, an information terminal 200, a security unit 300, and a network 1000.

The software download server 100 can be connected to the information terminal 200 via the network 1000.

In addition, the information terminal 200 can be connected to the security unit 300 using a near field radio network such as Bluetooth. According to the present embodiment, it is assumed that Bluetooth is used in connection as a representative example of the near field radio network. In addition, Bluetooth is just an example, and other than Bluetooth may be used in a connection method complying with other near field radio network standards.

Figure 2:
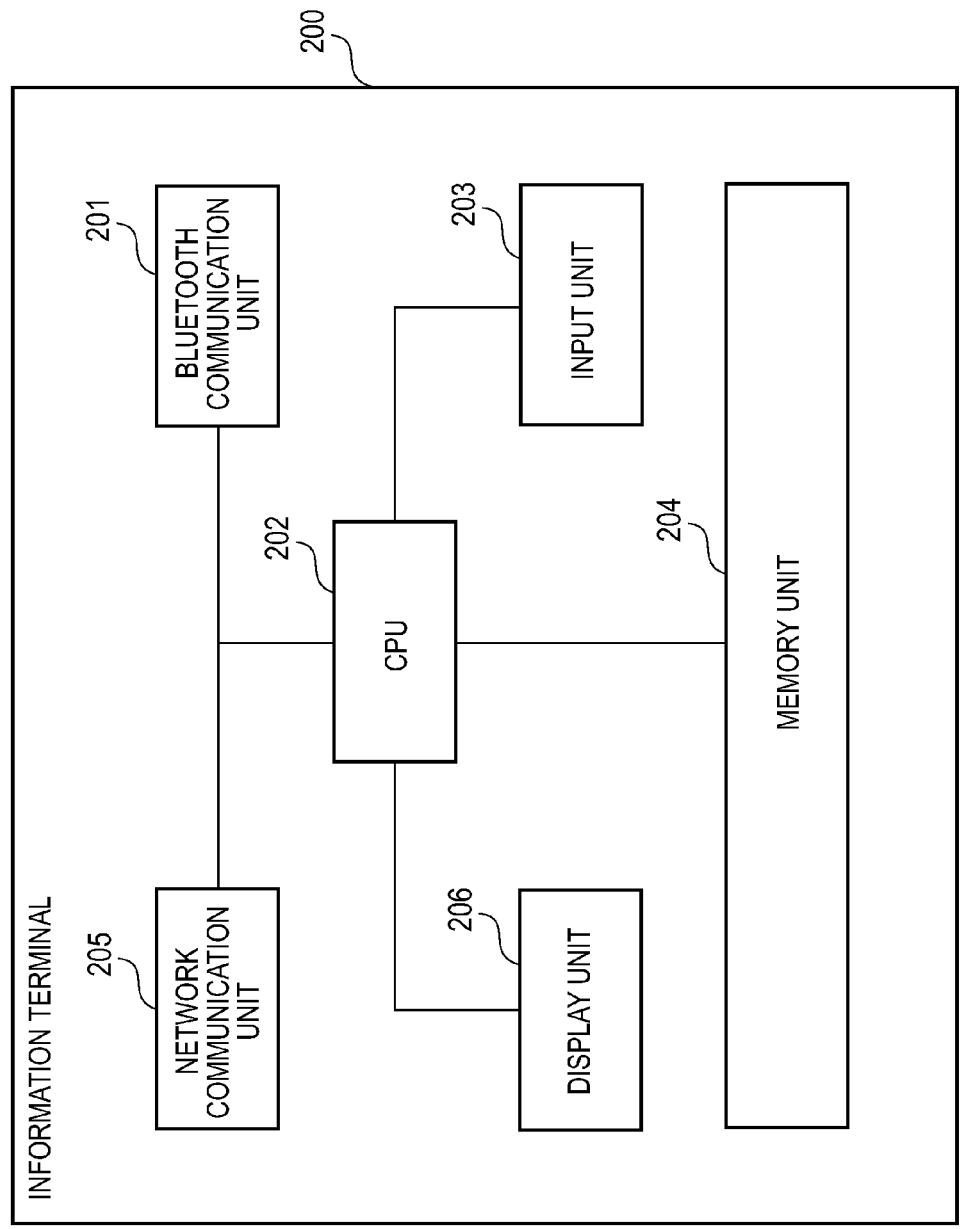
FIG. 2 A diagram illustrates a basic configuration of information terminal according to an embodiment of the invention.

FIG. 2 illustrates the configuration of the information terminal 200. Here, as a specific representative example of the information terminal 200, a personal computer, a mobile terminal such as a personal digital assistant (PDA), and the like may be provided.

The information terminal 200 includes a Bluetooth communication unit 201, a CPU 202, an input unit 203, a memory unit 204, a network communication unit 205, and a display unit 206.

The Bluetooth communication unit 201 is a part for connection to the security unit 300 via a near field radio network. The CPU 202 is a part for controlling the entire information terminal 200. The input unit 203 is a part for receiving input from a user and may include a keyboard and the like.

The memory unit 204 is a part for storing software for operating the information terminal, such as an operating system (OS). The network communication unit 205 is a part for connecting to the software download server 100 via a network. The display unit 206 is a part for displaying information and may include a display. The input unit 203 and the display unit 206 may be combined and implemented, for example, as a touch panel.

The memory unit 204 of the information terminal 200 has a function of downloading and storing update software and a time-limited authentication key from the software download server 100 to update software.

Figure 3:
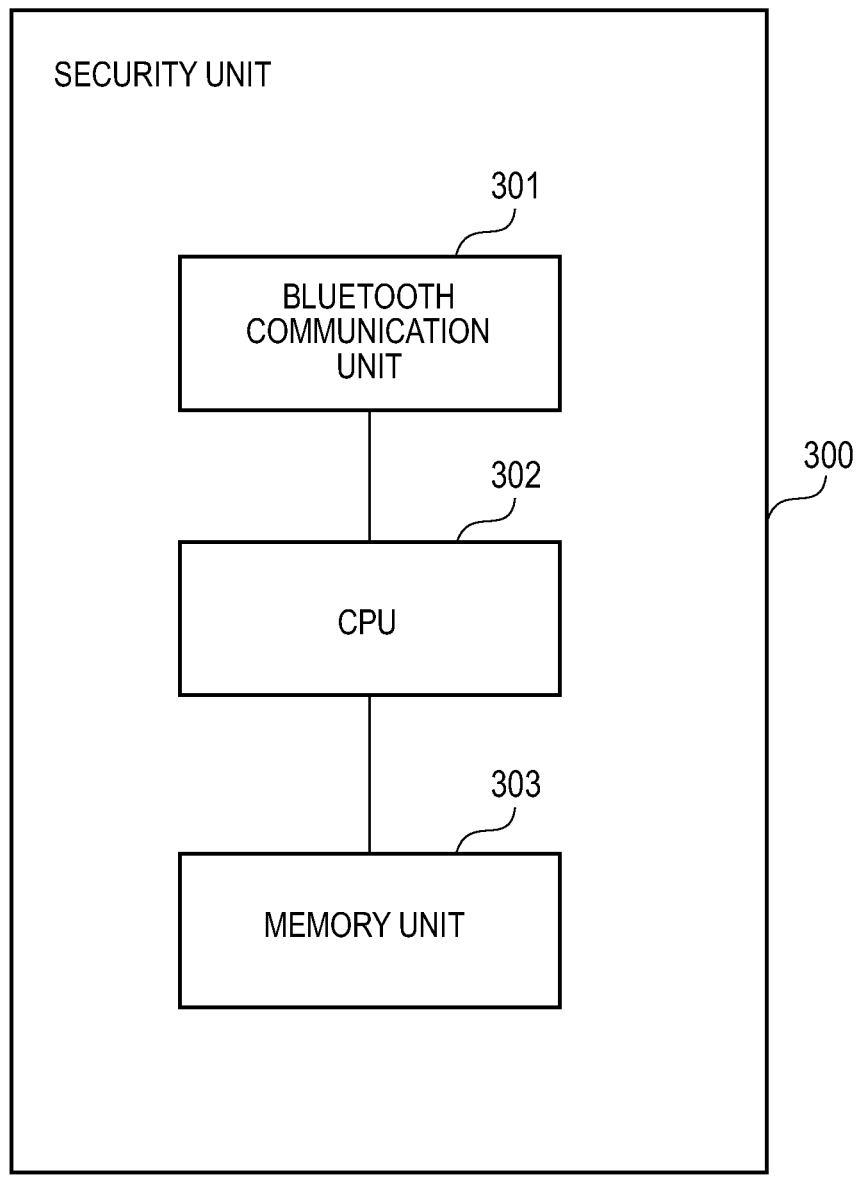
FIG. 3 A diagram illustrates a basic configuration of the security unit according to an embodiment of the invention.

FIG. 3 illustrates the configuration of the security unit 300.

The security unit 300 includes a Bluetooth communication unit 301, a CPU 302, and a memory unit 303.

The Bluetooth communication unit 301 is a part for connection to the information terminal 200 via a near field radio network. The CPU 302 is a part for controlling the entire security unit 300.

The memory unit 303 is a part capable of storing software for operating the security unit 300. The memory unit 303 has a function of storing a time-limited authentication key or a hash table as well as the OS.

Although not illustrated in FIG. 3, the security unit 300 has a physical external interface for receiving the time-limited authentication key or the hash table from an external side. What kind of specification is used in the corresponding external interface is not important in the present embodiment. For this reason, any specification may be employed in the external interface. For example, the time-limited authentication key and the hash table may be created in the outer side of the security unit 300 and may be stored using an interface (physical external interface) of a universal serial bus (USB), a PC card, an SD memory card, and the like.

Figure 4:
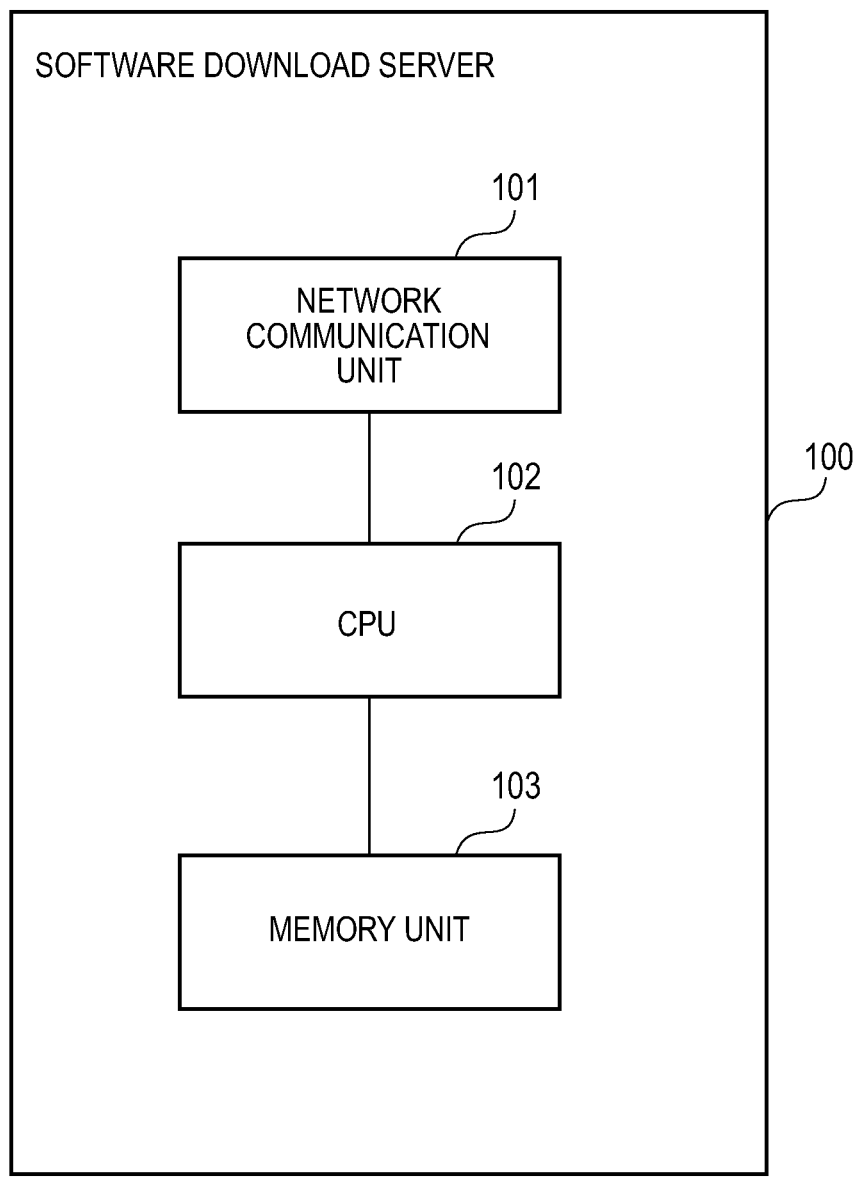
FIG. 4 A diagram illustrates a basic configuration of the software download server according to an embodiment of the invention.

FIG. 4 illustrates the configuration of the software download server 100.

The software download server 100 includes a network communication unit 101, a CPU 102, and a memory unit 103.

The network communication unit 101 is a part for connecting to the information terminal 200 via a network. The CPU 102 is a part for controlling the entire software download server 100.

The memory unit 103 has a function of storing update software or the hash table used in the download for updating the information terminal 200.

In FIGS. 1 to 4, some elements such as a power supply that do not relate to the subject matter of the present embodiment are not provided.

Next, a simple flow of the software update according to the invention will be described with reference to the flowchart of FIG. 5.

First Operation: as a preparation for updating software, a time-limited authentication key having a time limit is created. In addition, a hash table is created by computing and listing the hash values for the update software file and is encrypted with a time-limited authentication key (step S401 in FIG. 5).

Figure 5:
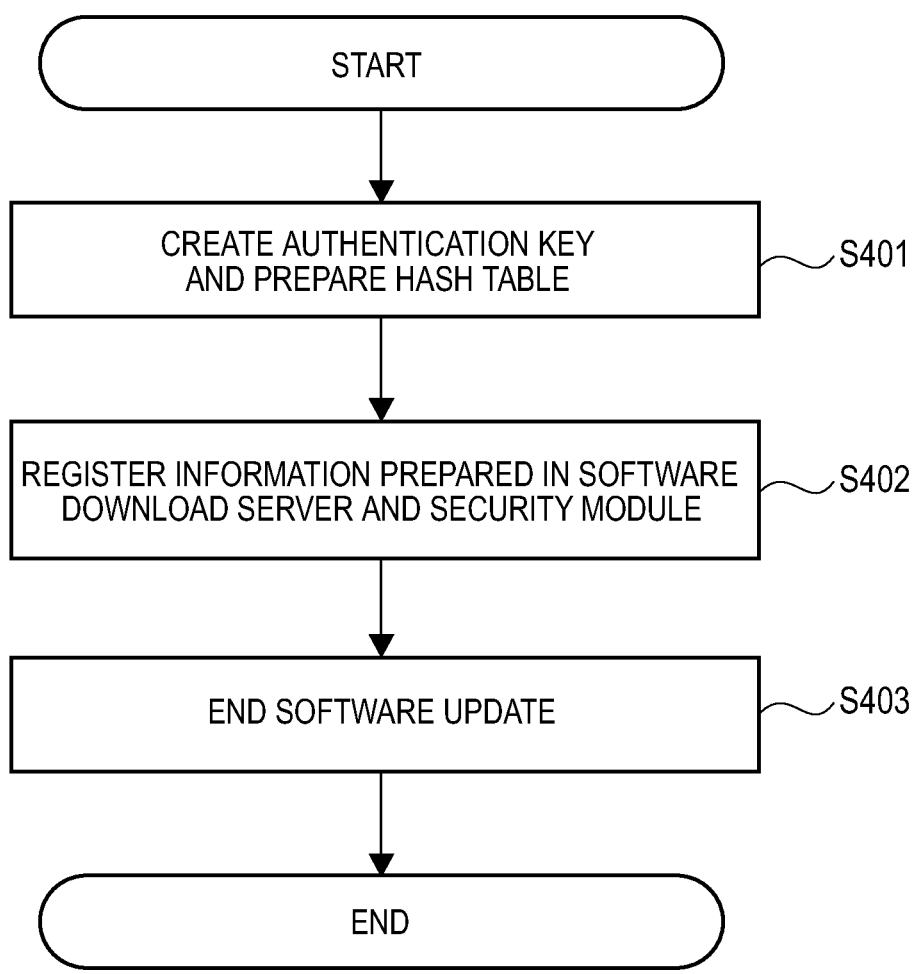
FIG. 5 A flowchart illustrates an overview of the operation according to an embodiment of the invention.

Second Operation: the hash table and the time-limited authentication key having an expiration created in step S401 of FIG. 5 are stored in the security unit 300 (step S402 in FIG. 5).

The first and second operations will be described in detail below with reference to FIG. 6.

Third Operation: the information terminal 200 obtains the hash table and the time-limited authentication key by communicating with the security unit 300 via a Bluetooth communication. The software download server obtains the hash table by communicating with 101 via a network. The hash table is compared with the decrypted time-limited authentication key. If they are identical, the download process is performed (step S403 in FIG. 5).

The third operation will be described in detail below with reference to FIGS. 7 and 8.

Next, the first and second operations described above will be described with reference to the flowchart of FIG. 6.

Figure 6:
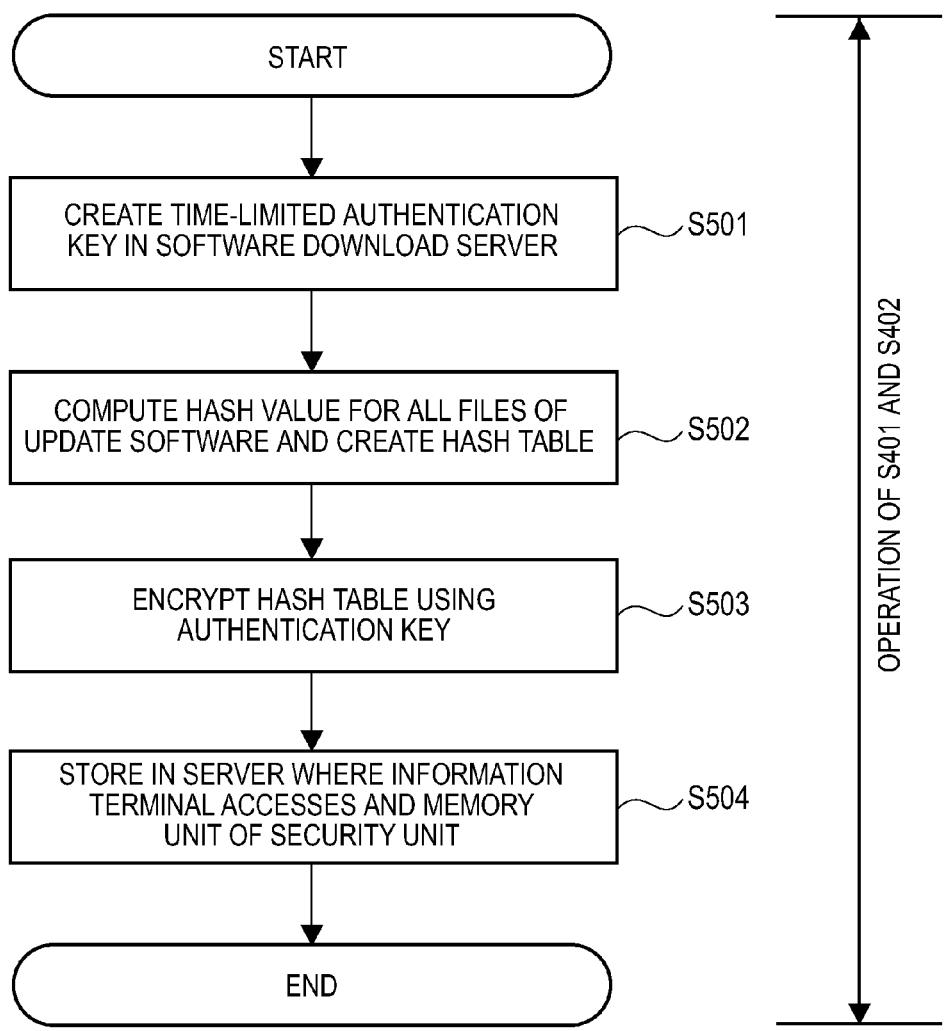
FIG. 6 A flowchart illustrates details of steps S401 and S402 in the operation according to an embodiment of the invention.

The software download server 100 creates a time-limited authentication key as a key having an expiration time limit (step S501 in FIG. 6). Since the authentication key has the expiration time limit, the time-limited authentication key is invalidated after the expiration time limit even when the time-limited authentication key is stolen. Therefore, it is possible to ensure security.

Then, the software download server 100 creates the hash table by computing each hash value for a plurality of files of the update software (step S502 in FIG. 6). This hash table serves as a list of the hash values of each file. The hash table is used to determine whether or not the downloaded update software files are falsified. In addition, the hash table is denoted by the "Hash Table" in the drawings.

Subsequently, the software download server 100 encrypts the hash table created in step S502 using the time-limited authentication key created in step S501 (step S503 in FIG. 6).

Furthermore, the software download server 100 stores the encrypted hash table created in step S503 and the update software in the memory unit 103 of the software download server 100. In addition, the encrypted hash table and the time-limited authentication key are stored in the memory unit 303 of the security unit 300 (step S504 in FIG. 6). As a result, a preparation for the software update process of the information terminal 200 is completed.

In addition, creation of the time-limited authentication key or the like may be performed by a device other than the software download server 100. For example, a device other than those illustrated in FIG. 1 may be used to create and encrypt the hash table or the time-limited authentication key, and the encrypted hash table and the created time-limited authentication key may be delivered to the security unit 300 or the software download server 100.

Next, a software update process of the information terminal 200 as the third operation described above will be described with reference to the flowcharts of FIGS. 7 and 8.

Figure 7:
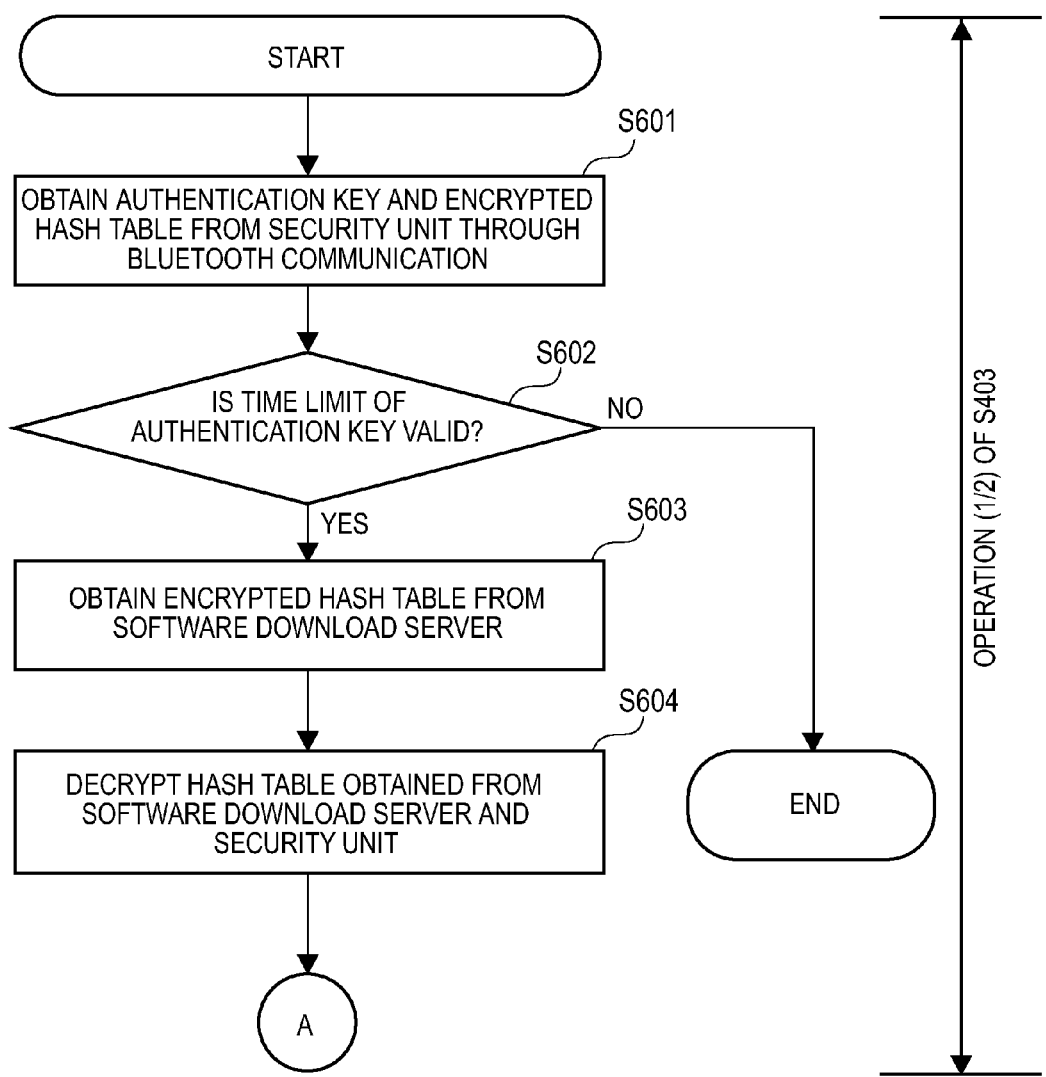
FIG. 7 A flowchart (1/2) illustrates details of step S403 in the operation according to an embodiment of the invention.

Initially, the information terminal 200 is connected to the security unit 300 via a Bluetooth connection and obtains the encrypted hash table and the time-limited authentication key stored in the security unit 300 in advance (step S601 in FIG. 7).

Subsequently, the information terminal 200 determines whether or not the time limit of the time-limited authentication key obtained in step S601 is valid (step S602 in FIG. 7).

In addition, if the time limit is valid (YES in step S602), the process advances to step S603. Otherwise, if the time limit is expired (NO in step S602), the download process is failed, and the process is ended.

Then, the information terminal 200 obtains the encrypted hash table from the software download server 100 (step S603 in FIG. 7). The hash table obtained from the software download server 100 and the hash table obtained from the security unit 300 are encrypted using the same encryption key.

The information terminal 200 decrypts the obtained hash tables within the information terminal 200 (step S604 in FIG. 7). The time-limited authentication key is obtained from the security unit 300 in step S601 in FIG. 7, and this key is used in the decryption.

The information terminal 200 compares two hash tables decrypted within the information terminal 200 (step S605). If it is determined that both hash tables are identical to each other (YES in step S606 in FIG. 8), the process advances to step S607 to initiate the update software download. Otherwise, if both the hash tables are different (NO in step S606 in FIG. 8), the operation is ended.

Figure 8:
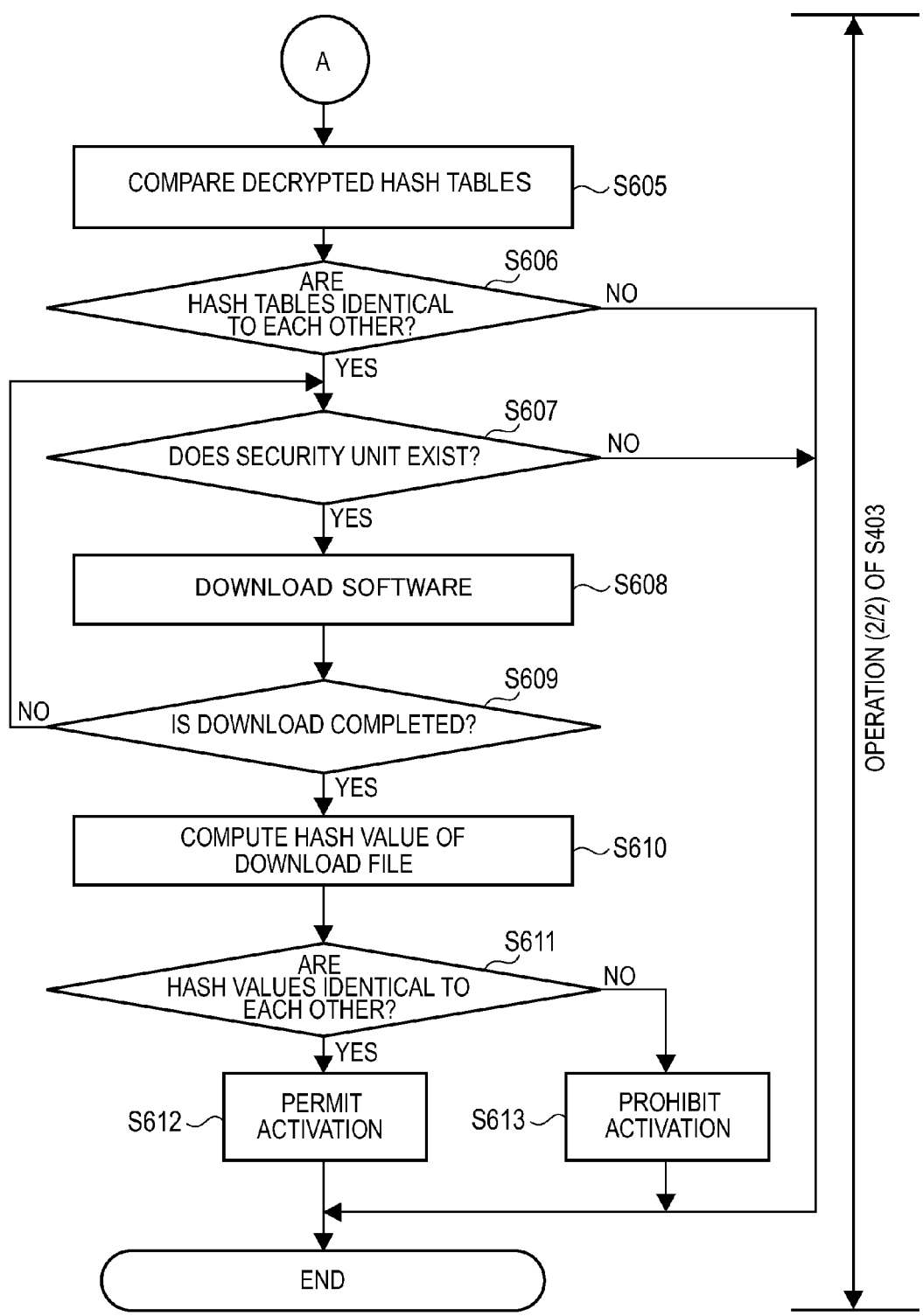
FIG. 8 A flowchart (2/2) illustrates details of step S403 in the operation according to an embodiment of the invention.

When the update software is downloaded, the information terminal 200 checks whether or not the security unit 300 exists in order to reliably execute the process from obtainment of the time-limited authentication key to the download of the update software to the information terminal 200 (step S607 in FIG. 8). This is to prevent fraudulent download when the information terminal 200 is stolen after the time-limited authentication key is obtained. The check of existence of the security unit 300 is performed at a constant interval using a timer and the like. If the existence is not confirmed, the download is immediately stopped and ended. In addition, the existence check interval may not be constant but may be performed inconstantly. For example, the check may be frequently performed immediately after the download is initiated. Alternatively, the check may be frequently performed when the download completion is approached.

If the existence of the security unit 300 is confirmed (YES in step S607 in FIG. 8), the information terminal 200 performs download of the update software from the software download server 100 (step S608 in FIG. 8). The information terminal 200 checks existence of the security unit 300 as described above during download (NO in step S609 in FIG. 8).

On the other hand, if the existence of the security unit 300 is not confirmed (NO in step S607 in FIG. 8), the information terminal 200 ends the operation.

When the download is completed (YES in step S609 in FIG. 8), the information terminal 200 computes the hash value of the downloaded software within the information terminal 200 (step S610 in FIG. 8). In addition, information terminal 200 compares the computed hash value with the obtained hash value (step S611 in FIG. 8).

If both the hash values are identical as a result of the comparison (YES in step S611 in FIG. 8), the information terminal 200 ends the software update process and permits activation of the software (step S612 in FIG. 8).

On the other hand, if both the hash values are not identical (NO in step S611 in FIG. 8), the information terminal 200 determines that the software is falsified and does not permit activation (step S613 in FIG. 8).

The aforementioned embodiment of the invention has many advantages as follows. As a first advantage, it is possible to reduce a network load.

The reason is that the authentication process is performed within the information terminal 200, and the network 1000 is used only when the hash table is obtained during the authentication process.

As a second advantage, it is possible to prevent fraudulent download.

The reason is that the download is not allowed at the time of the download if the information terminal 200 fails to check existence of the security unit 300 in Bluetooth.

As a third advantage, it is possible to prevent fraudulent download by setting an expiration time limit in the time-limited authentication key.

As a fourth advantage, it is possible for the information terminal 200 side to determine that the software falsified is not operated.

The reason is that the information terminal 200 computes the hash value of the software and compares it with the hash table.

According to the present embodiment, the network 1000 is used in the authentication only when the hash table is obtained, and the authentication process is performed within the information terminal. Therefore, no network load is generated in the authentication process with the server. Therefore, the problem in the technique disclosed in Patent Literature 1 is addressed.

According to the present embodiment, existence of the security unit is checked in the near field radio network. Therefore, resetting of positional information and the like is not necessary even when the installation site is changed. Therefore, the problem in the technique disclosed in Patent Literature 2 is addressed.

According to the present embodiment, the first to fourth advantages are obtained based on the aforementioned configuration. Therefore, the problems in the techniques disclosed in Patent Literatures 3 to 7 are addressed.

Next, modifications of the present embodiment described above will be described. While the present embodiment may be modified in various forms, the following three modifications will be exemplified.

Figure 9:
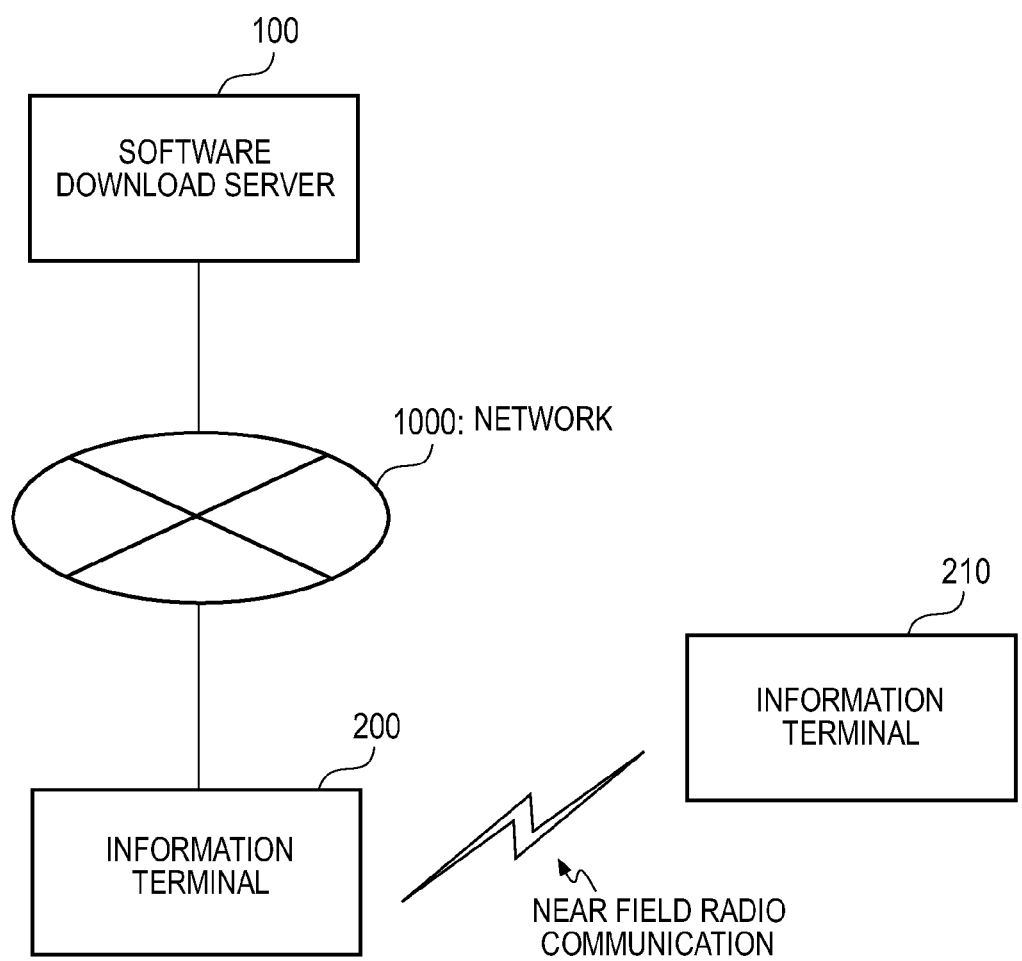
FIG. 9 A diagram illustrates a basic configuration according to a first modification that is a modified example of the embodiment of the invention.

The first modification is illustrated in FIG. 9. In the system configuration of FIG. 9, the security unit 300 may be substituted with the information terminal 210 having the same configuration as that of the information terminal 200. The information terminal 210 has the same configuration as that of the information terminal 200 illustrated in FIG. 2 and may satisfy the same function as that of the security unit 300.

For the software download process, the process flow is not illustrated because a similar configuration is used except that the security unit 300 is substituted with the information terminal 200.

Figure 10:
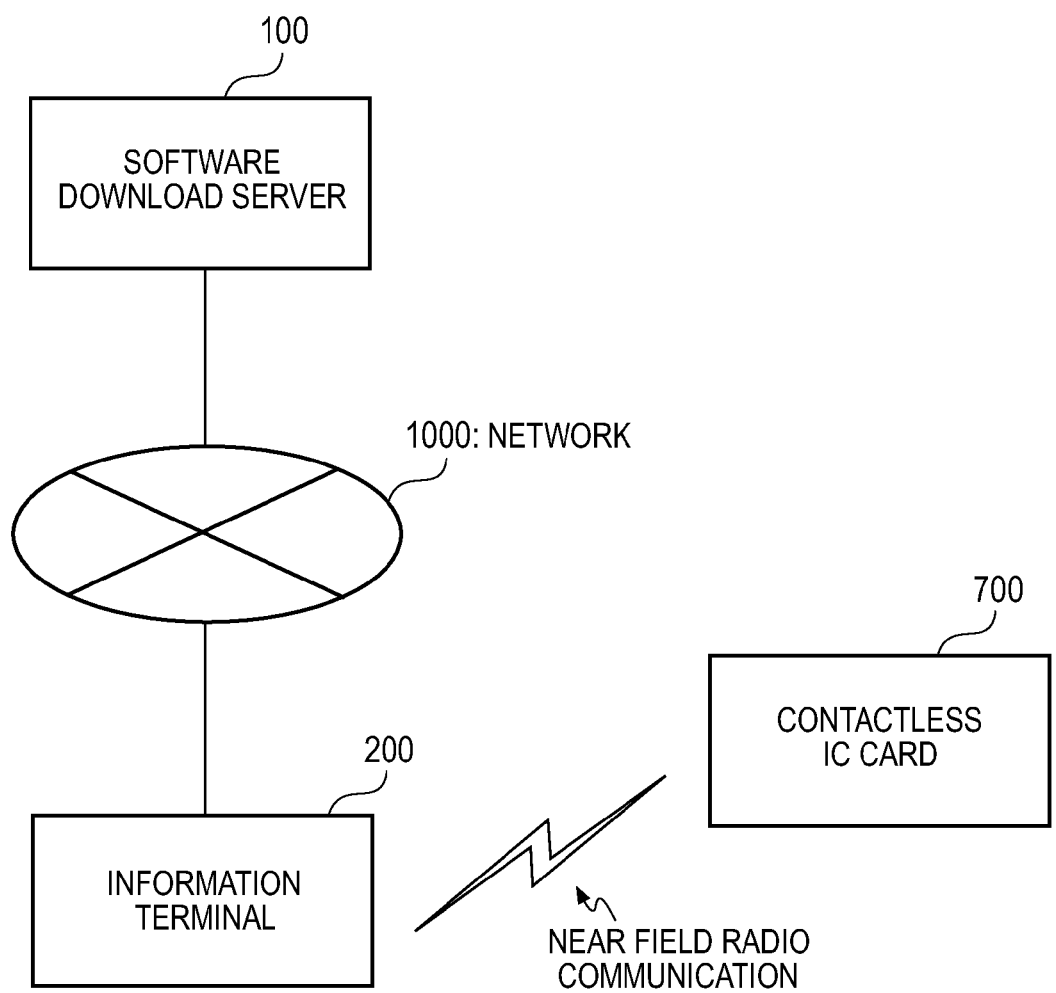
FIG. 10 A diagram illustrates a basic configuration according to a second modification that is a modified example of the embodiment of the invention.
Figure 11:
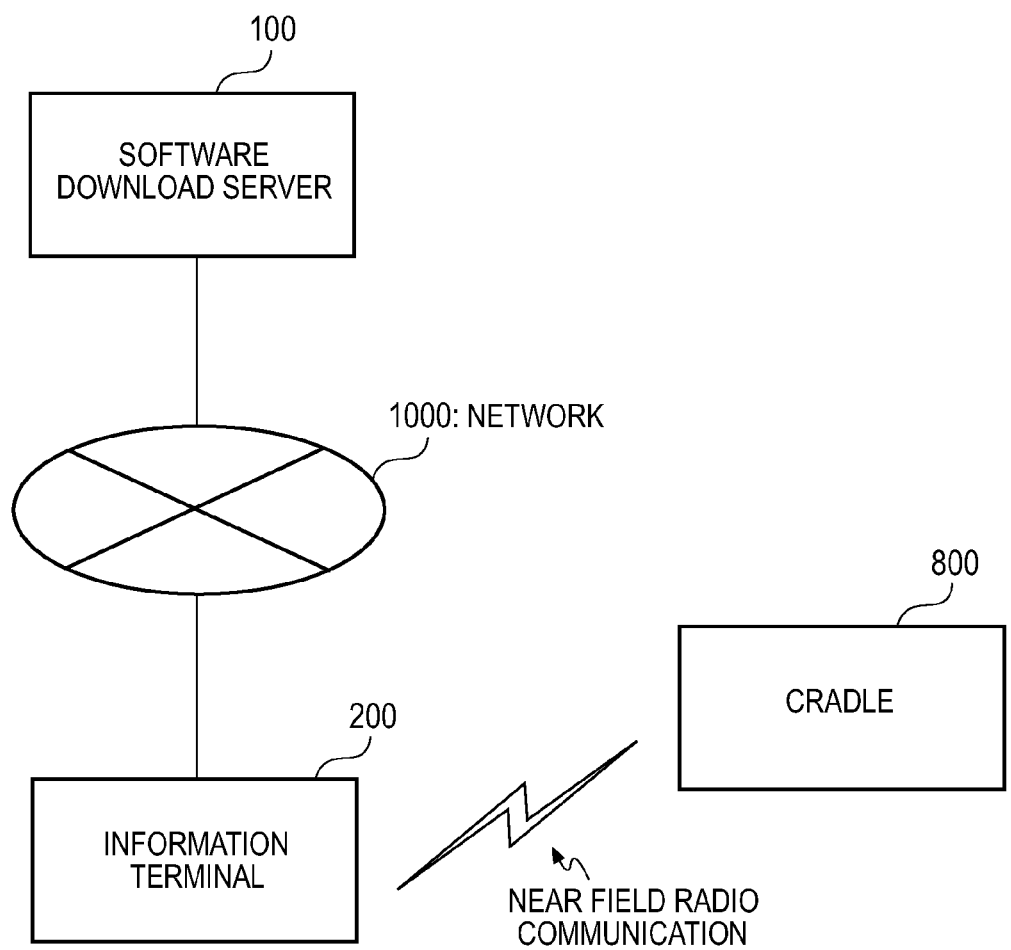
FIG. 11 A diagram illustrates a basic configuration according to a third modification that is a modified example of the embodiment of the invention.

Next, the second and third modifications are illustrated in FIGS. 10 and 11, respectively.

In such modifications, near field radio communication units other than Bluetooth specification are used to communicate with the security unit 300.

As illustrated in FIG. 10, in the system configuration, the security unit 300 may be substituted with the contactless IC card 700. For example, the contactless IC card 700 may be embedded in an employee identification card. The contactless IC card 700 and the information terminal 200 perform the near field radio communication instead of the Bluetooth communication. The same process may be implemented by performing near field radio communication with the information terminal 200 instead of communicating with the security unit at the time of the software download process.

As illustrated in FIG. 11, in the system configuration, the security unit 300 may be substituted with the cradle 800. The cradle 800 and the information terminal 200 may implement the same process by performing near field radio communication with the information terminal 200 instead of the security unit at the time of the software download process if a near field radio communication method such as Bluetooth communication or infrared communication is used.

How to use the security unit 300 described above is up to a user. For example, a system engineer or an operator who performs a software update work of the information terminal 200 may go to the site where the information terminal 200 exists and perform the update work. In addition, the hash table and the time-limited authentication key may be directly sent to a user of the information terminal 200 and allow a user to perform the update work.

In the aforementioned description, it is assumed that the authentication key has an expiration time limit. However, it may not be necessary to set the expiration time limit. Most of all, from the viewpoint of security, it would be appropriate that an expiration time limit of the key is set, and the update work is only allowed within that time limit. In addition, even when the expiration time limit is set, the expiration time limit may be substantially limitless as it being set to 100 years. According to the present embodiment, it may be possible to set the expiration time limit to an arbitrary value.

Each device of the software update system installed in the information terminal according to an embodiment of the invention may be implemented in hardware. Alternatively, the invention may be implemented by reading and executing, from a computer readable recording medium, a program causing a computer to function as each device of the software update system embedded in the information terminal.

The method of updating software installed in the information terminal according to an embodiment of the invention may be implemented in hardware. Alternatively, the invention may be implemented by reading and executing, from a computer reading recording medium, a program causing a computer to execute the method.

Although preferable embodiments of the invention have been described, the invention is not limited thereto. Various modifications may be possible without departing from the spirit and scope of the invention.

This application is based on Japanese Patent Application No. 2009-254920 filed on Nov. 6, 2009, and claims priority under Paris Convention based on Japanese Patent Application No. 2009-254920. In addition, the contents of Japanese Patent Application No. 2009-254920 are incorporated by reference. Although representative embodiments of the invention have been described in detail, it would be appreciated that various changes, substitutions, and alternatives may be made without departing from the spirit and scope of the invention as defined in the appended claims. Even when any claim is corrected in the application procedure, the inventors intend to encompass the claims and equivalents thereof.

A part of or all of the embodiments described above may be defined, but not limited thereto, as follows.

APPENDIX 1

A software update system of an information terminal including:
an information terminal;
a software download server connected to the information terminal via a network, the software download server storing update software; and
a security unit communicable with the information terminal via a near field radio network,
wherein the software download server creates a time-limited authentication key,
computes a hash value of a file included in the update software for each file to create a hash table in which hash values of a file is listed, and encrypts the hash table using the authentication key,
the security unit obtains the encrypted hash table and the authentication key from the software download server, and
the information terminal obtains the encrypted hash table from the security unit as a first table, obtains the authentication key from the security unit, determines whether or not a time limit of the authentication key is valid, obtains the encrypted hash table from the software download server as a second table if the time limit is determined to be valid, decrypts the first and second tables using the authentication key, compares the first and second tables after decryption, and initiates download of the update software from the software download server if it is determined both the tables are identical to each other.

APPENDIX 2

The software update system according to appendix 1, wherein the information terminal tries to check existence of the security unit at a constant or inconstant interval until the initiated download is ended, and stops the download if existence of the security unit has not been confirmed as a result of the try.

APPENDIX 3

The software update system according to appendix 1 or 2, wherein the information terminal computes a hash value of the downloaded update software when the download is completed, compares the computed hash value with the hash value in either the first table or second table after the decryption, and permits activation of the downloaded update software if both hash values are identical to each other.

APPENDIX 4

The software update system according to any one of appendices 1 to 3, wherein the security unit is operable as a mobile terminal, and the mobile terminal is operable as the security unit.

APPENDIX 5

An information terminal that updates software embedded therein, wherein the information terminal is configured to: obtain an encrypted hash table as a first table from a security unit communicable via a near field radio network, the encrypted hash table being created by a software download server by creating a time-limited authentication key, computing a hash value of a file included in the update software for each file to create a hash table in which hash values of a file are listed, and encrypting the hash table using the authentication key; obtain the authentication key from the security unit; determine whether or not a time limit thereof is valid; obtain the encrypted hash table as a second table from the software download server via a network if the time limit is determined to be valid as a result of the determination; decrypt the first and second tables using the authentication key; compare the first and second tables after decryption with each other; and initiate download of the update software from the software download server via a network if both the tables are identical to each other.

APPENDIX 6

The information terminal according to appendix 5, wherein the information terminal tries to check existence of the security unit at a constant or inconstant interval until the initiated download is ended, and stops the download if existence of the security unit has not been confirmed as a result of the try.

APPENDIX 7

The information terminal according to appendix 5 or 6, wherein the information terminal computes a hash value of the downloaded update software when the download is completed, compares the computed hash value with the hash value in either the first table or second table after the decryption, and permits activation of the downloaded update software if both hash values are identical to each other.

APPENDIX 8

A method of updating software of an information terminal in a system, the system including the information terminal, a software download server connected to the information terminal via a network, the software download server storing update software, and a security unit communicable with the information terminal via a near field radio network, the method comprising:
the software download server creating a time-limited authentication key, computing a hash value of a file included in the update software for each file to create a hash table in which hash values of a file are listed, and encrypting the hash table using the authentication key;
the security unit obtaining the encrypted hash table and the authentication key from the software download server; and
the information terminal obtaining the encrypted hash table as a first table from the security unit, obtaining the authentication key from the security unit, determining whether or not a time limit of the authentication key is valid, obtaining the encrypted hash table as a second table from the software download server if the time limit is determined to be valid as a result of the determination, decrypting the first and second tables using the authentication key, comparing the first and second tables after decryption, and initiating download of the update software from the software download server if both the tables are identical to each other.

APPENDIX 9

The method of updating software of the information terminal according to appendix 8, wherein the information terminal tries to check existence of the security unit at a constant or inconstant interval until the initiated download is ended, and the download is stopped when the existence of the security unit has not been confirmed as a result of the try.

APPENDIX 10

The method of updating software of the information terminal according to appendix 8 or 9, wherein the information terminal computes a hash value of the downloaded update software when the download is completed, compares the computed hash value with the hash value in either the first table or second table after the decryption, and permits activation of the downloaded update software if both the hash values are identical to each other.

APPENDIX 11

The method of updating software of the information terminal according to any one of appendices 8 to 10, wherein the security unit is operable as the mobile terminal, and the mobile terminal is operable as the security unit.

APPENDIX 12

A method of updating software installed in an information terminal, comprising: obtaining an encrypted hash table as a first table from a security unit communicable via a near field radio network, the encrypted hash table being created by a software download server by creating a time-limited authentication key, computing a hash value of a file included in the update software for each file to create a hash table in which hash values of a file are listed, and encrypting the hash table using the authentication key; obtaining the authentication key from the security unit; determining whether or not a time limit thereof is valid; obtaining the encrypted hash table as a second table from the software download server via a network if the time limit is determined to be valid as a result of the determination; decrypting the first and second tables using the authentication key; comparing the first and second tables after decryption with each other; and initiating download of the update software from the software download server via a network if both the tables are identical to each other.

APPENDIX 13

The method updating software according to appendix 12, wherein the information terminal tries to check existence of the security unit at a constant or inconstant interval until the initiated download is ended, and the download is stopped when the existence of the security unit has not been confirmed as a result of the try.

APPENDIX 14

The method updating software according to appendix 12 or 13, wherein the a hash value of the downloaded update software is computed when the download is completed, the computed hash value is compared with the hash value in either the first table or second table after the decryption, and activation of the downloaded update software is permitted if both the hash values are identical to each other.

APPENDIX 15

A software update program embedded in an information terminal that updates software installed therein, the software update program causing a computer to function as the information terminal, wherein the information terminal is configured to: obtain an encrypted hash table as a first table from a security unit communicable via a near field radio network, the encrypted hash table being created by a software download server by creating a time-limited authentication key, computing a hash value of a file included in the update software for each file to create a hash table in which hash values of a file are listed, and encrypting the hash table using the authentication key; obtain the authentication key from the security unit; determine whether or not a time limit thereof is valid; obtain the encrypted hash table as a second table from the software download server via a network if the time limit is determined to be valid as a result of the determination; decrypt the first and second tables using the authentication key; compare the first and second tables after decryption with each other; initiate download of the update software from the software download server via a network if both the tables are identical to each other.

APPENDIX 16

The software update program according to appendix 15, wherein the information terminal tries to check existence of the security unit at a constant or inconstant interval until the initiated download is ended, and the download is stopped when the existence of the security unit has not been confirmed as a result of the try.

APPENDIX 17

The software update program according to appendix 15 or 16, wherein the information terminal computes a hash value of the downloaded update software when the download is completed, compares the computed hash value with the hash value in either the first table or second table after the decryption, and permits activation of the downloaded update software if both the hash values are identical to each other.

The invention claimed is:
1. A software update system of an information terminal comprising:
 an information terminal;
 a software download server connected to the information terminal via a network, the software download server storing update software; and
 a security unit communicable with the information terminal via a near field radio network,
 wherein the software download server creates a time-limited authentication key, computes a hash value of a file included in the update software for each file to create a hash table in which hash values of a file is listed, and encrypts the hash table using the authentication key,
 the security unit obtains the encrypted hash table and the authentication key from the software download server, and
 the information terminal obtains the encrypted hash table from the security unit as a first table, obtains the authentication key from the security unit, determines whether or not a time limit of the authentication key is valid, obtains the encrypted hash table from the software download server as a second table if the time limit is determined to be valid, decrypts the first and second tables using the authentication key, compares the first and second tables after decryption, initiates download of the update software from the software download server if it is determined both the tables are identical to each other, computes a hash value of the downloaded update software as the download is completed, compares the computed hash value with the hash value in either the first or second table after the decryption, and permits activation of the downloaded update software if both hash values are identical to each other.

2. The software update system according to claim 1, wherein the information terminal tries to check existence of the security unit at a constant or inconstant interval until the initiated download is ended, and stops the download if existence of the security unit has not been confirmed as a result of the try.

3. The software update system according to claim 1, wherein the security unit is operable as a mobile terminal, and the mobile terminal is operable as the security unit.

4. An information terminal that updates software embedded therein, wherein the information terminal is configured to: obtain an encrypted hash table as a first table from a security unit communicable via a near field radio network, the encrypted hash table being created by a software download server by creating a time-limited authentication key, computing a hash value of a file included in the update software for each file to create a hash table in which hash values of a file are listed, and encrypting the hash table using the authentication key; obtain the authentication key from the security unit; determine whether or not a time limit thereof is valid; obtain the encrypted hash table as a second table from the software download server via a network if the time limit is determined to be valid as a result of the determination; decrypt the first and second tables using the authentication key; compare the first and second tables after decryption with each other; initiate download of the update software from the software download server via a network if both the tables are identical to each other; compute a hash value of the downloaded update software as the download is completed; compare the computed hash value with the hash value in either the first or second table after the decryption; and permit activation of the downloaded update software if both hash values are identical to each other.

5. A method of updating software of an information terminal in a system, the system including the information terminal, a software download server that is connected to the information terminal via a network and stores update software, and a security unit communicable with the information terminal via a near field radio network, the method comprising:

the software download server creating a time-limited authentication key, computing a hash value of a file included in the update software for each file to create a hash table in which hash values of a file are listed, and encrypting the hash table using the authentication key;

the security unit obtaining the encrypted hash table and the authentication key from the software download server; and the information terminal obtaining the encrypted hash table as a first table from the security unit, obtaining the authentication key from the security unit, determining whether or not a time limit of the authentication key is valid, obtaining the encrypted hash table as a second table from the software download server if the time limit is determined to be valid as a result of the determination, decrypting the first and second tables using the authentication key, comparing the first and second tables after decryption, initiating download of the update software from the software download server if both the tables are identical to each other, computing a hash value of the downloaded update software as the download is completed, comparing the computed hash value with the hash value in either the first or second table after the decryption, and permitting activation of the downloaded update software if both hash values are identical to each other.

6. The method of updating software of an information terminal according to claim 5, wherein the information terminal tries to check existence of the security unit at a constant or inconstant interval until the initiated download is ended, and the download is stopped when the existence of the security unit is not confirmed as a result of the try.

7. The method of updating software of an information terminal according to claim 5, wherein the security unit is operable as the mobile terminal, and the mobile terminal is operable as the security unit.

8. A method of updating software embedded in an information terminal, comprising: obtaining an encrypted hash table as a first table from a security unit communicable via a near field radio network, the encrypted hash table being created by a software download server by creating a time-limited authentication key, computing a hash value of a file included in the update software for each file to create a hash table in which hash values of a file are listed, and encrypting the hash table using the authentication key; obtaining the authentication key from the security unit; determining whether or not a time limit thereof is valid; obtaining the encrypted hash table as a second table from the software download server via a network if the time limit is determined to be valid as a result of the determination; decrypting the first and second tables using the authentication key; comparing the first and second tables after decryption with each other; initiating download of the update software from the software download server via a network if both the tables are identical to each other; computing a hash value of the downloaded update software as the download is completed; comparing the computed hash value with the hash value in either the first or second table after the decryption; and permitting activation of the downloaded update software if both hash values are identical to each other.

9. A non-transitory computer readable medium storing a software update program for updating software installed in an information terminal, the software update program causing a computer used as the information terminal to: obtain an encrypted hash table as a first table from a security unit communicable via a near field radio network, the encrypted hash table being created by a software download server by creating a time-limited authentication key, computing a hash value of a file included in the update software for each file to create a hash table in which hash values of a file are listed, and encrypting the hash table using the authentication key; obtain the authentication key from the security unit; determine whether or not a time limit thereof is valid; obtain the encrypted hash table as a second table from the software download server via a network if the time limit is determined to be valid as a result of the determination; decrypt the first and second tables using the authentication key; compare the first and second tables after decryption with each other; initiate download of the update software from the software download server via a network if both the tables are identical to each other; compute a hash value of the downloaded update software as the download is completed; compare the computed hash value with the hash value in either the first or second table after the decryption; and permit activation of the downloaded update software if both hash values are identical to each other.

10. The non-transitory computer readable medium according to claim 9, wherein the software update program causes the computer used as the information terminal to try to check existence of the security unit at a constant or inconstant interval until the initiated download is ended, and to stop the download when the existence of the security unit is not confirmed as a result of the try.

* * * * *